United States Patent Office 3,455,241
Patented July 15, 1969

3,455,241
PLANOGRAPHIC PRINTING PLATES
Glenn H. Perkins, West Peru, Maine, assignor to Oxford Paper Company, Rumford, Maine, a corporation of Maine
No Drawing. Continuation of application Ser. No. 589,524, Oct. 26, 1966, which is a continuation of application Ser. No. 479,060, Aug. 25, 1965, which in turn is a continuation-in-part of application Ser. No. 70,385, Nov. 21, 1960. This application Sept. 15, 1967, Ser. No. 668,207
Int. Cl. B41n 3/00; C09d 11/10; C08f 45/04
U.S. Cl. 101—453     14 Claims

ABSTRACT OF THE DISCLOSURE

Planographic printing plates are prepared by coating a base with an aqueous coating composition having a pigment mixture containing colloidal silica having a particle size between about 7 and 45 millimicrons and an adhesive containing a major amount of hydrophilic component with a minor amount of an oleophilic component.

---

This application is a continuation of my copending application Ser. No. 589,524, filed Oct. 26, 1966, now abandoned, which is in turn a continuation of my application Ser. No. 479,060, filed Aug. 25, 1965, now abandoned, which is in turn a continuation-in-part of my copending application Ser. No. 70,385, filed Nov. 21, 1960, now abandoned.

This invention relates to planographic printing plates and the method of making the same. More particularly, this invention relates to a planographic printing plate comprising a base having adhered thereto an insolubilized planographic coating comprising a pigment mixture and a crosslinked or insolubilized polymer, or mixture of polymers, said pigment mixture containing a colloidal silica having a particle size between 7 to 45 mllimicrons, the crosslinked or insolubilized polymer being prepared by copolymerizing a hydrophilic monomer with a minor amount of an oleophilic monomer and then cross-linking the resultant copolymer or by admixing an insolubilizable hydrophilic adhesive polymer or by admixing an insolubilizable oleophilic adhesive polymer and insolubilizing or cross-linking the mixture.

Planographic printing plates are made by applying to a base web or sheet a coating having, among other things, desirable hydrophilic-oleophilic properties, whereby a greasy composition or image may be retained to form an ink-receptive image, and an aqueous etch or fountain solution may be retained by the remainder of the plate to form an ink-repellant surface. Such plates may be mounted on a roller of an offset printing press, for example, and caused to pass successively in contact with a fountain solution and a printing ink. Ideally, the ink is totally rejected by the plate, except for the imaged areas thereof to which the ink adheres. The inked image is then transferred to a blanket for image reversal and applied to the sheet to be printed.

The making of superior planographic printing plates requires delicate balancing of a variety of coating characteristics, some of which tend to conflict with others. By way of example, the coating must accept and retain a sharp greasy image, while at the same time accepting and retaining the aqueous fountain solution. The fountain solution must be retained in such manner as to avoid "undermining" of the image in prolonged use. The coating must permit the making of erasures, when necessary, without causing "halos" or other undesired images to appear. The image must remain sharp throughout prolonged use, and not "tone." "Stop-go" characteristics, that is, the ability to print satisfactory first or second copies after a period of machine shut-down, must also be good. These and other characteristitcs must be properly balanced to provide of a superior plate, due regard being had for ease of manufacture and overall cost.

The present invention provides an improved planographic printing plate, which possesses all of the advantageous characteristics above mentioned and which is capable of economical manufacture and which may be varied easily to accommodate a variety of specific end uses.

Broadly, the improved planographic printing plates of this invention are prepared by forming an aqueous coating composition comprising a pigment containing a colloidal silica having a particle size between about 7 to 45 millimicrons, and a polymer which is formed by copolymerizing a hydrophilic monomer with a minor amount of an oleophilic monomer, or which is a mixture of an insolubilizable adhesive hydrophilic polymer with a minor amount of an insolubilizable adhesive polymer. A cross-linking agent or an insolubilizing agent is incorporated in the composition. This coating composition is then applied in a conventional manner to the surface desired, usually a wet-strength paper web, and the coating dried and cured to form an insoluble cross-linked planographic coating.

It has been found that by employing colloidal silica having a particle size between about 7 to 45 millimicrons in the pigment portion of the coating compositions of this invention, a wide variety of copolymers or polymer mixtures can be used as the adhesive portion of these coating compositions. Without this colloidal silica, these polymers would be oleophilic and therefore unsuitable for use in the preparation of planographic printing plates. Since the colloidal silica of very small particle size permits the use of oleophilic monomers, in these compositions, the adhesive component of these coating compositions can be adjusted to give the resulting plates a wide variety of characteristics depending upon the hydrophilic and oleophilic monomers used. The number and type of adhesives which can be used in planographic coatings are thus substantially enlarged. It has also been found that the presence of the oleophilic materials in the planographic coatings increases the internal platicization of these coatings and thereby prevents brittleness. Moreover, the adhesive properties and the toughness of the coatings are substantially improved.

The colloidal silica which can be used to form the pigment mixture of this invention should contain silica particles of very small size. The main average size of the silica particles should be within a range of from about 7 millimicrons to about 45 millimicrons. Although colloidal silicas containing silica particles of less than 7 millimicrons have not been commercially available, it is believed that the coating compositions of this invention may be advantageously prepared from colloidal silicas containing silica particles of a size even less than 7 millimicrons.

The most advantageous colloidal silicas are those which contain silica particles ranging in size from about 7 to 17 millimicrons. Such colloidal silicas are marketed by E. I. du Pont de Nemours and Company under the trade names Ludox S.M., Ludox, L.S., and Ludox H.S. and also by the Monsanto Chemical Company under the trade name Syton 200. The types of stabilized colloidal silicas and methods of making them are described in detail in U.S. Patents No. 2,244,325, issued June 3, 1941; No. 2,574,902, issued Nov. 13, 1951; and No. 2,597,872, issued May 27, 1952. Such colloidal silicas are generally marketed as a 30 percent $SiO_2$ dispersion, but as described in the above patents the colloidal silica can be prepared containing a higher or lower percent silica.

The pigment used in the coating compositions is advantageously a mixture of clay and colloidal silica. The ratio of clay to silica may vary quite widely from about 10:1 to about 1:1 depending upon the properties desired in the finished plate, the particle copolymer or polymer mixture employed, the presence of other inert materials or pigments in minor proportions, and so forth. A clay to silica ratio of 5:3 is, however, preferred.

Various known coating or filler clays can be used to form the pigment mixture according to this invention. Clays of small particle size are preferred since they seem to produce better results. Some examples of clays which can be used include various types of kaolin or china clay, Lustra Clay and so forth. Lustra Clay, marketed by the Southern Clay Company, has been found to be particularly advantageous.

Although it is preferred to use a clay along with the silica in the pigment mixture, other pigments may be used in place of, or in addition to, the clay, such as calcium silicate, barium sulfate, titanium dioxide, etc.

If desired, dispersing agents may be employed along with these pigment mixtures, such as sodium hexametaphosphate, disodium dihydrogen pyrophosphate, tetrapotassium pyrophosphate, sodium silicate, etc.

Generally in a particular coating composition, there is an optimum ratio to adhesive and experiments indicate that, overall, the pigment-adhesive ratio should preferably be between about 7:1 and 3:1.

The hydrophilic monomers which are used in the preparation of the copolymer coating composition of this invention include any suitable hydrophilic monomer which can normally be used in the preparation of planographic plates and which can readily be copolymerized with the particular oleophilic monomer with which it is to be copolymerized. Such hydrophilic monomers can be readily ascertained by one skilled in the art and include such monomers as acrylamide, methacrylamide, acrylic and methacrylic acids, and so forth. Mixtures of the hydrophilic monomers can also be used. Examples of hydrophilic polymers which can be used in admixtures with the oleophilic polymers include homopolymeric and copolymers of the above-disclosed hydrophilic monomers.

The oleophilic monomers which can be used in the preparation of the coating compositions of this invention include any suitable oleophilic monomer which can be readily copolymerized with the particular hydrophilic monomer with which it is copolymerized. Such oleophilic monomers include B-(dialkyl phosphono) acrylic esters; diallylcyanamide; 2-(difluoromethyl) acrylonitrile; ethylidene diacrylate; glycidyl acrylate; glycidyl methacrylate; B-hydroxyethyl acrylate; maleic anhydride; methyl acrylate; 2-(trifluoromethyl) acrylonitrile; unsaturated acyl gelatins; unsaturated alkyds; vinyl acetate; 2-vinylbenzimidazole; vinyl chloride; vinyl pyridines; 2-vinyltetrahydronaphthalene; B-vinyltetrahydronaphthalene; and also other multi-component polymers such as acrylonitrile, ethyl acrylate; acrylonitrile, methyl acrylate; acrylonitrile, N-methylacrylamide; N-allylacetoacetamide, vinyl acetate; unsaturated glycerides, cyclopentadiene or dicyclopentadiene; and 2-vinylpyridine, metacrylic acid. Mixtures of the oleophilic monomers can be used. Examples of oleophilic polymers which can be used in admixture with hydrophilic polymers or copolymers include homopolymers and copolymers of the above-disclosed oleophilic monomers.

The copolymers which may be used according to this invention are prepared by simply mixing a solution of one or more of the hydrophilic monomers with an emulsion of one or more of the oleophilic monomers. The mixture is then advantageously copolymerized in the presence of a suitable catalyst. It has been found advantageous to mix the monomers in a reaction flask and sweep out the air with carbon dioxide. The reaction flask is then heated and a suitable polymerizing catalyst is added, such as ammonium or potassium persulfate, hydrogen peroxide or other water soluble peroxides. The reaction is then permitted to continue until the monomers have been copolymerized.

The copolymers or mixtures of polymers, depending upon the nature of the particular copolymer or mixture employed, are advantageously methylolated so that they can be more readily cross-linked in the subsequent cross-linking step. Any suitable means for methylolating these copolymers can be used. For example, when acrylamide is used as the hydrophilic monomer, it has been found that it is advantageous to employ slightly more than one mole of formaldehyde for each mole of acrylamide unit present in the copolymer. This copolymer is reacted with formaldehyde in an alkaline pH, about 10, and heated for about 1 hour at 55° C. The pH is maintained at about 10 during this time. The pH is then adjusted to about 6.5 with acetic acid.

It has been found that the oleophilic monomer should be employed in minor proportions compared to the total monomer or polymer mixture. Although the preferred amount of oleophilic monomer to use would vary depending upon the particle monomers or polymers employed, an amount equivalent to about 5–20 percent based on the total monomer mixture is preferred. A "minor" amount, however, would include percentages as high as about 40 percent.

The polymer mixtures when used are either water soluble or water dispersible. Both the hydrophilic and oleophilic polymers are film-forming and have adhesive properties and are capable of being insolubilized or cross-linked, such as with the cross-linking agents listed below.

Advantageously, the cross-linking agent used in the coating composition is a dimethylol urea, and the ratio of the cross-linking agent to the adhesive may advantageously be from approximately 10 percent to 70 percent and preferably about 50 percent, based on the adhesive. Other suitable cross-linking agents can also be used, such as trimethylol phenol, urea-formaldehyde, N,N'-ethylene dimethylol cyclic urea marketed by Monsanto Chemical Company under the trademark Scriptite 45, melamine formaldehyde and other amine-aldehyde compounds, glyoxal, other dialdehydes, and so forth. When the copolymer is of such a nature that it will react and cross-link with itself, the copolymer then can be considered as the cross-linking agent.

A catalyst is advantageously added to the composition to promote curing. The catalyst may be a salt, such as zinc phenol sulfonate, zinc sulfamate, zinc silicofluoride, zinc chloride, zinc acetate, alum, ammonium chloride, ammonium sulfate, and ammonium phosphate, as well as salts of other di-valent and tri-valent metals, e.g, lead, calcium, manganese, cerium, lanthanum. In addition, it is frequently desirable to add an appropriate amount of acetic acid, which serves to thin the composition to the desired final consistency, if thinning is necessary, and advantageously bring the pH down to about 5–6.

Coating compositions according to the invention are advantageously prepared by first preparing the pigment mixture and adding thereto the copolymer or mixed polymer while stirring. Next the cross-linking agent, catalyst, and acetic acid can be added. The mixing may be done at room temperature, and the viscosity of the mixture is advantageously adjusted to about 200 centipoises, Brookfield.

The coating composition may be applied to a base web or sheet by conventional apparatus, such as air knives or roll coasters. The amount of coating may vary from about 2 to 10 pounds per ream of 3300 square feet, with 6 to 8 pounds being most satisfactory. After coating, the stock is dried and cured at a suitable temperature. Temperatures as low as 140° F. and as high as 350° F. have been used, although even lower or higher temperatures may also be used. The curing time may advantageously range from about 2 to 20 seconds, or more, as may be determined by one skilled in the art. A temperature of about 350° F. and a curing time of 20 seconds are preferred.

The resultant cross-linked insolubilized coating possesses excellent properties of accepting and holding both water and greasy ink.

The following examples illustrate the manner of preparing the improved planographic plates of this invention in more detail. Parts are by weight. The colloidal silica used was Syton 200 and had a particle size of about 15 millimicrons.

EXAMPLE 1

A copolymer of acrylamide and di n-butyl itaconate was prepared as follows:

Acrylamide: 85 parts dissolved in 700 parts water
Di n-butyl itaconate: 15 parts emulsified in 200 parts water The di n-butyl itaconated emulsion and the acrylamide solution were mixed in a reaction flask and the air swept out with carbon dioxide. The temperature was raised to 65° C. and 0.2 part ammonium persulfate (dissolved in 10 parts water) was added. Twenty-five parts isopropyl alcohol were then added and the reaction allowed to continue for one hour. The viscosity of the resulting copolymer was 1510 cps. Brookfield, at 24° C. Isopropyl alcohol was employed as a modifier to control the chain length of the polymer. Triton X155 (1 part), an alkyl aryl polyether alcohol, manufactured by Rohm & Haas Co., was used as an emulsifying agent.

This copolymer was then methylolated by reacting it with formaldehyde. For each mole of acrylamide unit present in the copolymer, slightly more than one mole of formaldehyde was used. The copolymer and the formaldehyde were mixed together and the pH adjusted to 10 with sodium hydroxide. The temperature was brought up to 55° C. and maintained there for one hour with stirring. The pH was then adjusted to approximately 6 with acetic acid.

A coating composition was prepared as follows using the methylolated copolymer prepared as indicated above:

| | Parts |
|---|---|
| Methylolated copolymer (12.4%) | 64.5 |
| Lustra Clay (60%) | 42.0 |
| Colloidal silica (30%) | 50.0 |
| Dimethylol urea | 4.0 |
| Alum (10%) | 27.0 |
| Acetic acid (50%) | 2.5 |
| Butyl alcohol | 5.0 |

A coating composition containing a mixture of the above ingredients was coated on a suitable base stock, dried and cured at 350° F. for 20 seconds. The resultant planographic printing plates possessed an excellent hydrophilic-oleophilic balance, permitting good image adherence and good image life while at the same time permitting good water retention. These plates produced clean copy, good toning, and possessed good image, correction life, and stop-go properties. The plates were tough but showed no brittleness at all.

EXAMPLE 2

Following the procedure of Example 1, the following copolymers were prepared (parts are by dry basis):

Copolymer A

| | Parts |
|---|---|
| Acrylamide | 90 |
| Acrylonitrile | 9 |
| Styrene | 5 |
| Ammonium persulfate | 0.2 |

Copolymer B

| | Parts |
|---|---|
| Acrylamide | 89 |
| Ethyl acrylate | 10 |
| Styrene | 5 |
| Ammonium persulfate | 0.2 |

Copolymer C

| | Parts |
|---|---|
| Acrylamide | 85 |
| Acrylonitrile | 5 |
| Methylmethacrylate | 9 |
| Styrene | 5 |
| Ammonium persulfate | 0.2 |

Copolymer A, though not methylolated, was employed in the preparation of planographic printing plates according to the procedure of Example 1 using the following formulae:

| | Parts |
|---|---|
| Copolymer A (11.2%) | 71.5 |
| Lustra Clay (60%) | 42.0 |
| Colloidal silica (30%) | 50.0 |
| Dimethylol urea | 4.5 |
| Alum (10%) | 27.0 |
| Acetic acid (50%) | 2.5 |

Plates were then made using 73 parts of unmethylolated Copolymer B (11 percent) in place of Copolymer A.

Additional plates were then made using 75 parts of unmethylolated Copolymer C (10.7 percent) in place of Copolymer A.

The resultant plates possessed planographic properties as good as those of Example 1.

EXAMPLE 3

Following the procedure of Example 1, the following copolymers were prepared:

Copolymer D

| | Parts |
|---|---|
| Acrylamide | 98 |
| Hexylmethacrylate | 6 |
| Ammonium persulfate | 0.2 |
| Isopropyl alcohol | 25 |

Copolymer E

| | Parts |
|---|---|
| Acrylamide | 90 |
| Ethyl pyridyl ethyl acrylate | 10 |
| Ammonium persulfate | 0.2 |
| Mercaptosuccinic acid (as a modifier) | .05 |

Copolymer F

| | Parts |
|---|---|
| Acrylamide | 90 |
| Divinyl sulfone | 10 |
| Ammonium persulfate | 0.2 |
| Isopropyl alcohol | 25 |

Copolymer G

| | Parts |
|---|---|
| Acrylamide | 83 |
| Ethyl acrylate | 21 |
| Ammonium persulfate | 0.2 |
| Isopropyl alcohol | 25 |

Copolymers D, E, F, and G were methylolated and printing plates were then prepared according to the procedure described in Example 1 according to the following formulae (parts are by weight):

| | (1) | (2) | (3) | (4) |
|---|---|---|---|---|
| Copolymer: | | | | |
| D (10.2%) | 78.5 | | | |
| E (12%) | | 66.5 | | |
| F (09.8%) | | | 82 | |
| G (11%) | | | | 72 |
| Lustra Clay (60%) | 42 | 42 | 42 | 42 |
| Colloidal silica (30%) | 50 | 50 | 50 | 50 |
| Dimethylol Urea | 4 | 4.5 | 4 | 2 |
| Alum (10%) | 27 | 27 | 27 | 27 |
| Acetic acid (50%) | 2.5 | 2.5 | 2 | 2.5 |
| Butyl alcohol | | 5 | 2 | |

The resultant plates possessed planographic properties as good as those of Example 1. Printing plates were prepared using all the above formulations except without the use of the colloidal silica; the resultant plates were entirely unsatisfactory for use in planographic printing.

EXAMPLE 4

Eighty-nine parts of polyacrylamide were admixed with 10 parts polyethylacrylate and 5 parts of polystyrene. 71.5 parts of this polymer mixture were admixed with 42.0 parts of a Lustra Clay slurry (60 percent solids), 50 parts of a colloidal silica dispersion (30 percent solids) having average particle size of about 7 millimicrons, 4.5 parts dimethylol urea, 27 parts alum (10 percent in water) and 2.5 parts of a 50 percent acetic acid solution. This composition was then used to prepared planographic printing plates in the same manner as set forth in Example 1. The plates possessed substantially the same properties as the plates prepared in Example 1.

I claim:

1. The method of making a planographic printing plate which comprises applying a planographic printing surface to a base by coating said base with an aqueous coating composition comprising a pigment mixture, said mixture containing a colloidal silica having a particle size between about 7 to 45 millimicrons, a copolymer which is prepared by copolymerizing a hydrophilic monomer with a minor amount of an oleophilic monomer, and cross-linking agent capable of cross-linking said copolymer, and reacting the copolymer with the cross-linking agent in the presence of the pigment to form an insoluble planographic coating on said base.

2. The method of claim 1 in which the copolymer is methylolated before it is cross-linked.

3. The method of claim 1 in which the colloidal silica comprises between about 10 percent to about 50 percent of the total pigment mixture.

4. The method of claim 1 in which the hydrophilic monomer is acrylamide.

5. The method of claim 1 in which the oleophilic monomer which is copolymerized wtih the hydrophilic monomer is present in an amount equivalent to about 5–20 percent based on the total amount of the hydrophilic monomer plus the oleophilic monomer.

6. A planographic printing plate comprising a base and an insolubilized planographic surface thereon, said surface comprising a pigment mixture and a cross-linked copolymer, said pigment mixture containing a colloidal silica having a particle size between about 7 to 45 millimicrons, and said cross-linked copolymer being prepared by copolymerizing a hydrophilic monomer with a minor amount of an oleophilic monomer and then cross-linking the resultant copolymer.

7. The planographic printing plate of claim 6 in which the copolymer is methylolated before it is cross-linked.

8. The planographic printing plate of claim 6 in which the coloidal silica comprises between about 10 percent to about 50 percent of the total pigment mixture.

9. The planographic printing plate of claim 6 in which the hydrophilic monomer is acrylamide.

10. The planographic printing plate of claim 6 in which the oleophilic monomer, which is copolymerized with the hydrophilic monomer, is present in an amount equivalent to about 5–20 percent based on the total amount of the hydrophilic monomer plus the oleophilic monomer.

11. The planographic printing plate of claim 6 which contains an ink-receptive image on the planographic surface.

12. A planographic printing plate comprising a base and an insolubilized planographic surface thereon, said surface comprising a pigment mixtrue and a cross-linked polymer mixture, said polymer mixture comprising a major amount of a film-forming adhesive hydrophilic polymer and a minor amount of film-forming adhesive oleophilic polymer, said pigment mixture containing a colloidal silica having a particle size between about 7 and 45 millimicrons.

13. The planographic plate of claim 12 which contains an ink-receptive image on the planographic surface.

14. The method of making a planographic printing plate which comprises applying a planographic printing surface to a base by coating said base with an aqueous coating composition comprising a pigment mixture and a polymer mixture, said polymer mixture comprising a mixture of a major amount of a film-forming adhesive hydrophilic polymer with a minor amount of a film-forming adhesive oleophilic polymer, said pigment mixture containing colloidal silica having a particle size between about 7 and 45 mllimicrons and a cross-linking agent capable of cross-linking the polymers of the polymer mixture, and reacting the polymers with the cross-linking agent in the presence of the pigment mixture to form an insoluble planographic coating on said base.

References Cited

UNITED STATES PATENTS

| 2,930,317 | 3/1960 | Perkins | 101—462 |
| 3,016,823 | 1/1962 | Thurlow | 101—462 |
| 3,017,826 | 1/1962 | Salzberg | 101—460 |
| 3,181,460 | 5/1965 | Perkins et al. | 101—462 |
| 3,228,327 | 1/1966 | Heffner | 101—462 |

DAVID KLEIN, Primary Examiner

U.S. Cl. X.R.

101—457, 462; 117—132, 155, 161; 260—41